United States Patent
Kitajima

[11] Patent Number: 5,808,681
[45] Date of Patent: Sep. 15, 1998

[54] ELECTRONIC STILL CAMERA

[75] Inventor: Tatsutoshi Kitajima, Kodaira, Japan

[73] Assignee: Ricoh Company, Ltd., Tokyo, Japan

[21] Appl. No.: 632,091

[22] Filed: Apr. 15, 1996

[30] Foreign Application Priority Data

Apr. 13, 1995 [JP] Japan .................................. 7-088033
Jan. 31, 1996 [JP] Japan .................................. 8-015651

[51] Int. Cl.$^6$ .................................................. H04N 5/222
[52] U.S. Cl. ........................... 348/371; 348/223; 348/370
[58] Field of Search .................................. 348/223, 224, 348/225, 227, 228, 370, 371, 655, 222, 9

[56] References Cited

U.S. PATENT DOCUMENTS

| | | | |
|---|---|---|---|
| 5,260,774 | 11/1993 | Takayama | 348/370 |
| 5,550,587 | 8/1996 | Miyadera | 348/223 |
| 5,568,194 | 10/1996 | Abe | 348/223 |
| 5,671,013 | 9/1997 | Nakao | 348/234 |

FOREIGN PATENT DOCUMENTS

| | | | |
|---|---|---|---|
| 05075314 | 11/1988 | Japan | 9/4 |
| 2 288575 | 11/1990 | Japan | |
| 5 75314 | 10/1993 | Japan | |

*Primary Examiner*—Andrew I. Faile
*Assistant Examiner*—Alicia M. Harrington
*Attorney, Agent, or Firm*—Oblon, Spivak, McClelland, Maier & Neustadt, P.C.

[57] ABSTRACT

In each optional area of an object to be photographed, image data obtained when a strobe (10) flashes a light and a CCD (3) is exposed to light from the object is compared with image data obtained when the CCD (3) is exposed to light from the object without flashing a light from the strobe by a data processing section 6. A CPU (12) then determines how much the light of the strobe contributes to photography in the each area which has been compared. After that, the CPU (12) suitably selects either a white balance control value given when the strobe does not flash a light or a predetermined white control value given when the strobe flashes a light and performs final white balance control. Both of the values are determined based on sensor data transmitted from a color measuring sensor (9) or based on an image signal transmitted from the CCD (3).

12 Claims, 6 Drawing Sheets

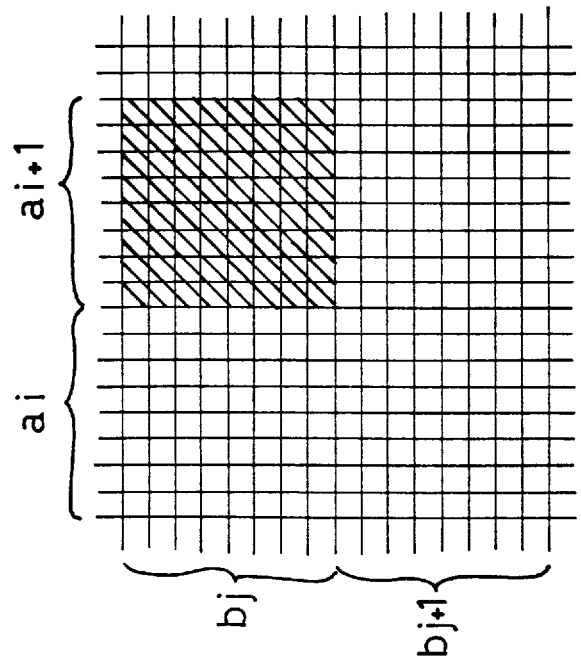
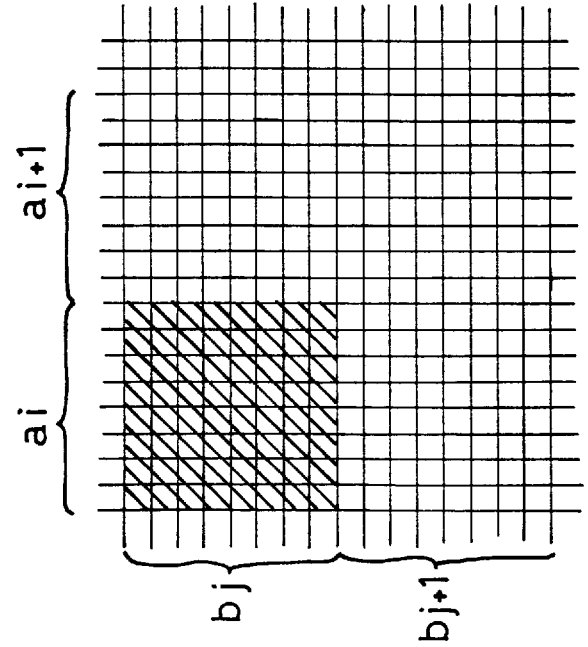

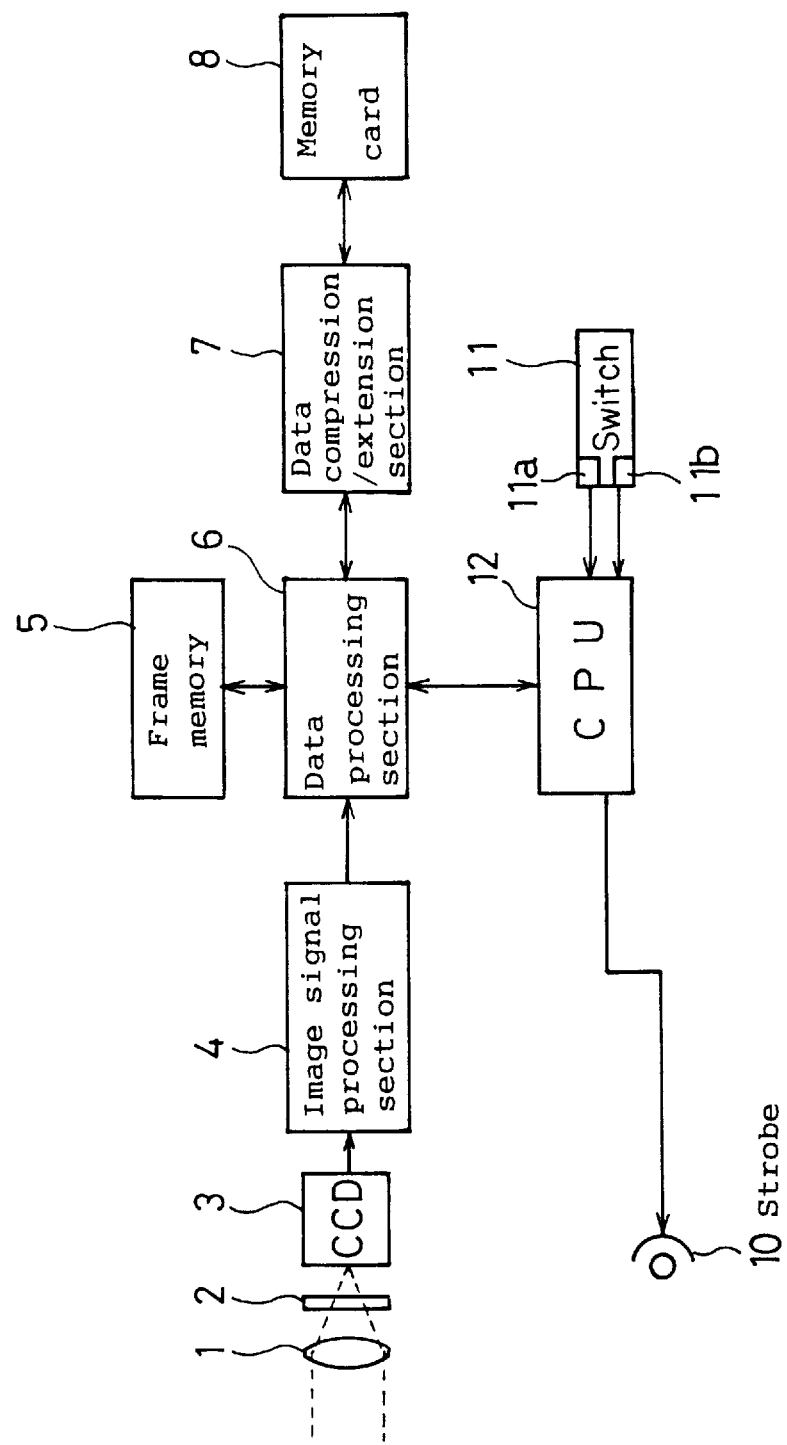

ELECTRONIC STILL CAMERA

BACKGROUND OF THE INVENTION

1. Field of the Invention

The present invention relates to an electronic still camera in which an object to be photographed is picked up by an image pickup element, such as a charge coupled device (CCD), and image data of the object output from the image pickup element is stored in a memory means while considering white balance.

2. Description of the Prior Art

Generally, a color temperature is used to indicate characteristics of light impinging on a photographic object and is expressed by an absolute temperature °K (kelvin). Conventionally, in a normal television set, the standard of a color temperature used when an object is photographed is 3200° K of illumination light of a studio lamp, and coloration of the object illuminated with the illumination light of the color temperature is properly reproduced.

On the other hand, there are many scenes when photographing an object, namely, various photographing places and situations. The color temperature of illumination light for illuminating the object depends on the respective scenes. Specifically, there is a difference in color temperature between natural light, such as sun light, and artificial light, such as a fluorescent lamp or an incandescent bulb. Further, referring to, for example, the natural light, there is a difference between fine weather and cloudy weather or between day time and evening. In the case of candles and incandescent bulbs, the color temperature is in the vicinity of approximately 2,000° K, and in the case of bluish light, such as that of fine weather, the color temperature is in the vicinity of 10,000° K. According to photographing conditions, photographing situations, and environments, the object reaches various color temperature states.

If the object under the illumination light of different color temperatures as described above is picked up by a video camera which performs all the same signal processing regardless of the different color temperatures, the basis of the white balance of white=R+G+B (R=G=B) is ruined, and therefore accurate coloration cannot be reproduced. Accordingly, in order to properly reproduce the coloration according to the respective photographing scenes, it is necessary to correct image signals by electrical processing so that the sensitivities, amplification degrees, etc. of the color signals R, G, and B are balanced. Such electrical processing is called a white balance adjustment. This automatic correction is called AWB control, i.e., automatic white balance control.

In the AWB control, for example, use is made of a sensor for detecting a R (red) component and a sensor for detecting a B (blue) component. Signals from the sensors are passed through a logarithmic compression-subtraction circuit and, from the ratio between the R and B signals, information about color temperature is obtained. According to the color temperature information, a gain of each color signal is controlled.

The electronic still camera using a CCD also adopts the AWB control. In the electronic still camera performing strobe photography, within the range of arrival of strobe light at the object, the AWB control is carried out on the basis of the color temperature of a strobe color. In this photography, within the range of non-arrival of the strobe light, the AWB control is carried out on the basis of the color temperature of other illumination light. When the strobe photography is carried out in this way, consideration must be given to the color temperature. Therefore, various devices have been proposed and embodied in order to cope with changes in color temperature which is a standard in the strobe photography.

For example, in an electronic still camera disclosed in Japanese Patent Laid-Open Publication No. Hei 2-288575, if, as a result of distance measurement, a photographic object is within the distance range within which strobe light sufficiently arrives at the object, white balance control is carried out based on a predetermined AWB control value (AWB control value for strobe light) given when the strobe light is emitted. Further, in the electronic still camera, if the object is at a far distance which the strobe light cannot cover, a suitable AWB control value is set based on the color temperature of the strobe light and the color temperature of the object itself to carry out the white balance control.

Further, in an image pickup device disclosed in Japanese Patent Publication No. Hei 5-75314, at the time of strobe photography, the quantity of light of illumination light different in color temperature from strobe light is detected to correct an AWB control value.

However, in the electronic still camera of No. Hei 2-288575, according to the distance to a main photographic object, either an AWB control value for strobe emission or an AWB control value for illumination of the background is selectively used to carry out the white balance control. Therefore, in a scene in which the main object at which strobe light can arrive and its background at which the strobe light cannot arrive are mixed, there is a problem in that white balance for only one of the object and the background is adjusted, and therefore proper which balance cannot be made for the whole photographing image plane including the object and the background.

Further, in the image pickup device of No. 5-75314, intermediate white balance control between the object and the background can be made, but a problem resides in that, as in the other conventional electronic still camera, a case occurs in which proper white balance cannot be made for the whole photographing image plane.

SUMMARY OF THE INVENTION

It is therefore an object of the present invention to provide an electronic still camera in which, even in a scene where a main object at which the light of a strobe can arrive and its background at which the strobe light cannot arrive are mixed, proper white balance can be made for the whole photographing image plane including the object and the background.

To achieve the object, an electronic still camera according to the present invention comprises an image pickup element, such as a charge coupled device, for picking up an object; a frame memory for temporarily storing image data output from the image pickup element; comparison means for, in each optional area of the object, comparing at least image data obtained when the image pickup element is exposed to light from the object after a strobe flashes a light with image data obtained when the image pickup element is exposed to light from the object without the strobe flashing a light; determination means for determining how much the light of the strobe has contributed to the each optional area which has been compared by the comparison means; white balance value fixing means for fixing a white balance control value given when the strobe does not flash a light; and white balance control means for, with respect to image data obtained when the image pickup element is exposed to light from the object after the strobe flashes a light, controlling white balance such that, in the each compared area, either a white balance control value fixed by the white balance value fixing means or a predetermined white balance control value given when the strobe flashes a light is selected in accordance with a determination made by the determination means.

According to the electronic still camera thus arranged, the contribution degree of the light of the strobe is determined in each optionally selected area of a picked-up image, and suitable selection is made between a white balance control value fixed by the white balance value fixing means which is a value given when the strobe does not flash a light and a predetermined white balance control value given when the strobe flashes a light, and accordingly the final white balance control is performed. As a result, for example, even in a scene where there are mixed a main object at which the light of the strobe can arrive and its background at which the strobe light cannot arrive and which is illuminated with light other than the strobe, both the object and the background are photographed in a good state in which the white balance is maintained between the two.

Further, based on the contribution degree of the light of the strobe which is determined by the determination means, a white balance control value in each area of the object is suitably selected and set from values ranging from the white balance control value fixed by the white balance value fixing means to the predetermined white balance control value given when the strobe flashes a light. Accordingly, the variation of the white balance at a boundary line between the main object and the background can be made smoother, and thereby natural white balance control is carried out.

Further, if there is provided a regulation means for regulating an allowable width of a control value suitably selected from values ranging from the white balance control value fixed by the white balance value fixing means to the predetermined white balance control value given when the strobe flashes a light, an AWB control value is prevented from abruptly varying between the respective areas of the object. As a result, natural white balance control can be carried out.

Further, if there is provided an object movement detection means for detecting the movement of the object by comparing image data of a plurality of picked-up images, when this object movement detection means detects that the amount of movement of the object is larger than a predetermined amount, a predetermined white balance control value in the flashing of the strobe can be selected to perform the white balance control. Accordingly, by comparing images which have been obtained individually in time, white balance control using an AWB control value for the light of the strobe can be performed when the object moves quickly or when the camera is in panning. Therefore, malfunction is prevented.

Further, when an image picked up when the strobe does not flash a light is smaller in quantity of light than a predetermined quantity uniformly over substantially the whole surface of the image, a white balance control value fixed by the white balance value fixing means or a predetermined white balance control value in the flashing of the strobe is selected in each area of the object to be determined by the determination means with respect to image data obtained when the image pickup element is exposed to light from the object after the strobe flashes a light.

On the other hand, in the case of, for example, backlight (counterlight) by which a picked-up image is not uniformly darkened over substantially the whole surface of the image, a predetermined white balance value in the flashing of the strobe is selected perform the white balance control.

Accordingly, in a special scene, such as that of backlight, the processing of white balance based on comparison between data obtained when the strobe flashes a light and data obtained when the strobe does not flash is not performed. Therefore, malfunction is prevented.

Further, if there is provided an amplification means for amplifying image data about an area of the object in which non-arrival of the strobe light is determined by the determination means and the quantity of light is smaller than a predetermined quantity, it is possible to amplify a luminance level of image data in an area of the object at which the light of the strobe does not arrive and which is dark. As a result, unbalance of brightness in the image is overcome.

BRIEF DESCRIPTION OF THE DRAWINGS

FIGS. 5(A) and 5(B) are explanatory views of a part of a pixel of a CCD of FIG. 1.

FIG. 8 is an explanatory view showing another example of the circuit construction of the electronic still camera of FIG. 1.

DESCRIPTION OF THE PREFERRED EMBODIMENT

The preferred embodiment of the present invention will be described hereinafter with reference to the drawings.

Figure 1:
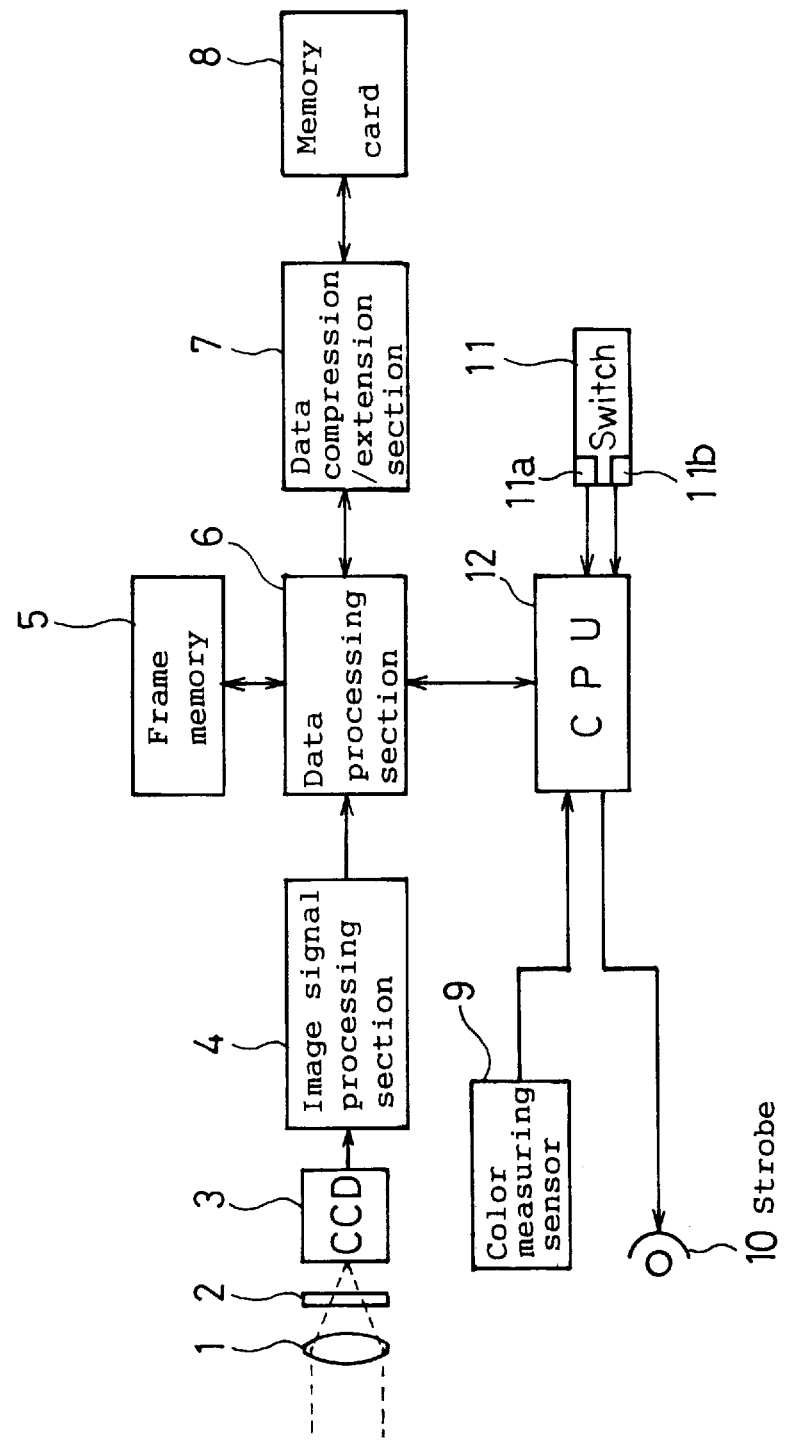
FIG. 1 is a block diagram schematically showing a circuit construction of an electronic still camera for explaining an embodiment of the present invention.

FIG. 1 is a block diagram showing a constitution for explaining one embodiment of the present invention. In FIG. 1, an electronic still camera comprises a photographic lens 1, a shutter 2, a CCD 3 which is a solid image pickup element (an electronic image pickup element), an image signal processing section 4, a frame memory 5, a data processing section 6, a data compression/extension section 7, a memory card 8 as an external recording medium, a color measuring sensor 9 for obtaining color temperature information relating to R signal and B signal, a strobe 10, a switch 11 (a photographic switch), and a CPU (a central processing unit) 12 as operation control means.

The external switch 11 comprises a first release switch 11a and a second release switch 11b which are sequentially turned on by the operation of a photographic button (a push button), not shown. That is, the external switch 11 employs a 2-push type construction so that in a first pushed state where the photographic button is pressed down by a stroke, the first release switch is turned on, and in a second pushed state where the photographic button is pressed down by full stroke (the fully pushed state), the second release switch 11b is turned on. Since this construction is known, a detailed description thereof is omitted.

The shutter 2 is opened by turning on the second release switch 11b of the external switch 11. When the shutter 2 is opened, an object (a photographic subject) and its background are guided to the CCD 3 through the photographic lens 1 and the shutter 2, and an object image and a background image are formed on the CCD 3. At this time, the CCD 3 is subjected to photoelectric conversion according to the quantity of light from the object and the background, and outputs an analog image signal which is received by the image signal processing section 4.

The image signal processing section 4 is provided with a DCS (Correlated Double Sampling Circuit) for receiving an output from the CCD 3 to carry out digital signal processing, an analog/digital conversion circuit, and so on. Moreover, the image signal processing section 4 converts an analog image signal from the CCD 3 into image data of a digital signal and outputs the resultant data.

The image data subjected to the digital signal processing is written into the frame memory 5 by the control of the data processing section 6. The frame memory 5 comprises a DRAM for temporarily storing image data. The data processing section 6 performs the control of write and read of image data to and from the frame memory 5 and the comparison of image data.

Further, the data processing section 6 is used as comparison means for comparing two image data stored in the frame memory 5. As one example of these comparisons, the ratio between the data corresponding to the same pixel is taken, and the value of the ratio will be a contribution degree of a strobe light specified by the present invention. At least two or more AWB control values can be transferred to the data processing section 6.

Moreover, the data processing section 6 is used as white balance control means which selects the AWB control value every pixel on the basis of the aforementioned comparison result, and controls a color gain to output it to the data compression/extension section 7.

The data compression/extension section 7 is provided so that, when image data is input from the data processing section 6, the image data is compressed to transfer it to the memory card 8. The memory card 8 stores the image data subjected to the data compression processing in the data compression/extension section 7. On the other hand, the data compression/extension section 7 is provided so that, when image data is input from the memory card 8, the data is subjected to extension processing to input the resultant image data into the CPU 12.

The color temperature information data from the color measuring sensor 9 is input into the CPU 12.

The CPU 12 is used as the AWB control value decision means in which when the first release switch 11*a* of the external switch 11 is turned on, the AWB control value is decided by the sensor data from the color measuring sensor 9, and transfers at least two or more thus decided AWS control values to the data processing section 6. Moreover, the CPU 12 converts the digital image data subjected to the data extension processing by the data compression/extension section 7 into the image data to output it as a reproduced image signal to a liquid crystal display unit or the like, not shown. Further, the CPU 12 is used as a determination means for determining a contribution degree of the strobe light every object area from the two image data compared by the data processing section 6 as the comparison means. The CPU 12 further also serves as an object detection means for detecting the movement of an object from a difference between the compared two image data.

Next, the function of the CPU 12 of the electronic still camera constructed as described above will be explained with reference to FIGS. 1 and 2.

Figure 2:
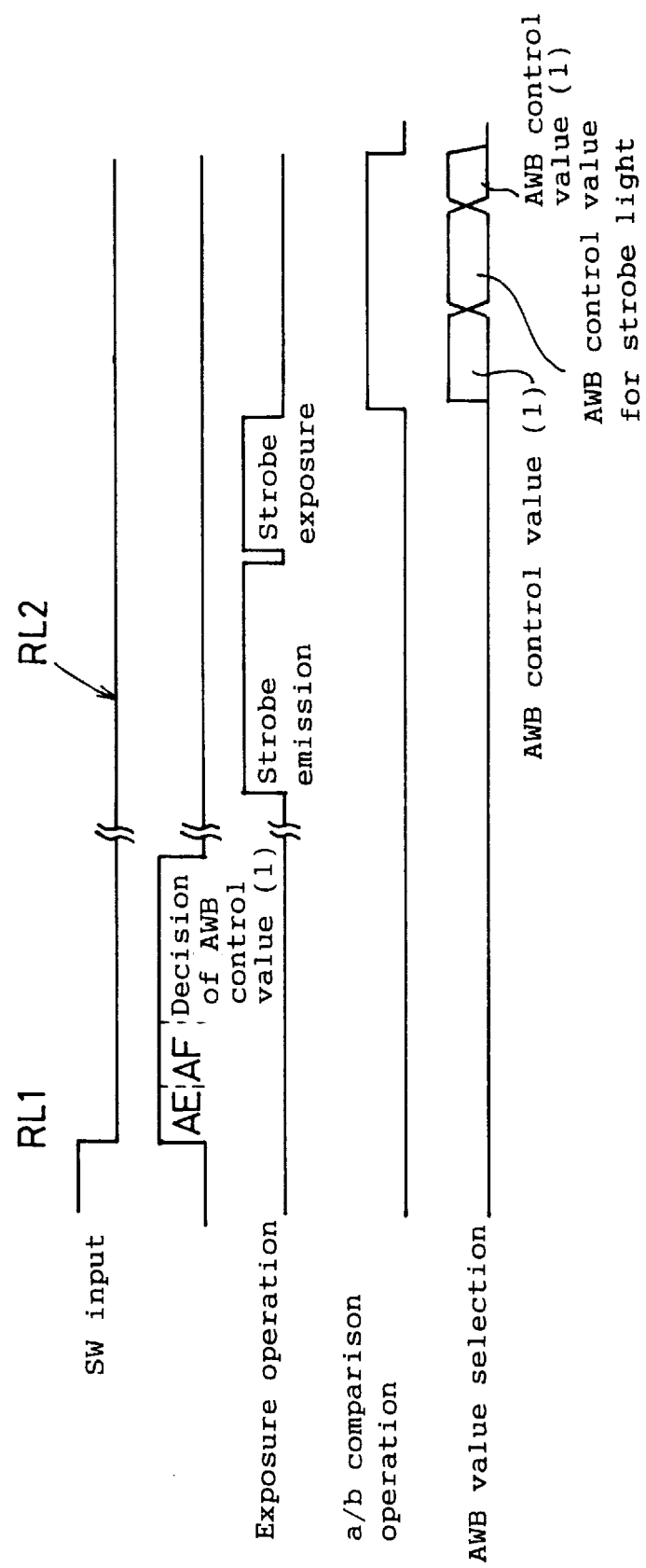
FIG. 2 is a timing chart of the operation mainly of white balance in the electronic still camera in the embodiment.

FIG. 2 is a timing chart of the operation of mainly white balance control of the electronic still camera shown in FIG. 1. By turning on a power switch, not shown, sensor data from the color measuring sensor 9 is input into the CPU 12. At this time, the CPU 12 is in a state of standby for the turning-on of the external switch 11.

When the first release switch 11*a* is turned on by the operation of the external switch 11, the CPU 12 performs the control and processing of AE (automatic exposure) and AF (automatic focussing) through a means, not shown. Since this configuration can employ a known mechanism of a camera, a description thereof is omitted.

Further, when the first release switch 11*a* is turned on, the CPU 12 decides the AWB control value (1) by the sensor data from the color measuring sensor 9. The CPU 12 then transfers this AWB control value (1) to the data processing section 6.

When, from the control and processing of the AE and AF, it is determined that the quantity of light of a photographing scene is smaller than a predetermined quantity and the scene is dark and therefore a flash of light of the strobe is required, the CPU 12 transfers a preset AWB control value for the strobe light in the strobe 10 to the data processing section 6.

In this state, when the second release switch 11*b* of the external switch 11 is turned on, the CPU 12 causes the strobe 10 to emit a flash of light so that first exposure is performed. The image data obtained in the first exposure is stored in the frame memory 5 via the data processing section 6.

After the first exposure, the CPU 12 instructs to perform second exposure in which the strobe light is not emitted to obtain image data. By the way, the conception of the image data obtained as a result of the exposure in which the strobe light is not emitted includes that of image data obtained as a result of exposure carried out in such a manner that, for example, the quantity of the strobe light is made small so that the strobe light can hardly arrive at the object.

Thereafter, in the data processing section 6, the image data obtained in the second exposure is compared with that obtained in the first exposure. That is, the data processing section 6 calculates the value of a/b indicating a contribution degree of the strobe light, wherein a is image data obtained in the first exposure in which the strobe light is emitted, and b is image data obtained in the second exposure in which the strobe light is not emitted.

The CPU 12 judges that, when a/b≈1, the pixel is in an area at which the strobe light does not arrive and, when a/b>1, the pixel is in an area at which the strobe light fully arrives. On the basis of the result of the comparison, the data processing section 6 corrects the color gain by the AWB control value (1) for the pixel at which the strobe light does not arrive (the object area) and corrects the color gain by the AWB control value for the strobe light for the pixel at which the strobe light arrives (the object area) to output data to the data compression/extension section 7.

The value a/b which is a contribution degree of the strobe light represents a quantity affected by the strobe light. Accordingly, the AWB control value is selected according to the value a/b, and a suitable value is selected from values ranging from the AWB control value (1) to the AWB control value for strobe light by the CPU 12. Accordingly, the white balance control can be carried out on the basis of a more appropriate AWB control value.

Further, as described above, in the case where the AWB control value is suitably selected and changed every pixel (object area), the variably width of the control value is limited by the CPU 12. Accordingly, even when the movement of the object is quick, the AWB control value cannot be acutely changed between the pixels, thus preventing occurrence of erroneous operation.

When the movement of the object is quick, since accurate comparison every pixel is difficult, the following processing is carried out. For the comparison, the data processing section 6 and the CPU 12 are used.

Also, in this case, after the completion of the first exposure in which the strobe light is emitted, the second exposure in which the strobe light is not emitted is carried out as described above. The CPU 12 controls the data processing section 6 to cause characteristic portions, such as a contour in the image, to be extracted as data about the first characteristic portion from the image data obtained in the first exposure by the data processing section 6. Moreover, the CPU 12 detects the presence of a great difference (a movement) in the photographing scene by comparing the characteristic portion obtained in the first exposure with that obtained in the second exposure.

Accordingly, when the difference of the photographing scene is detected by the CPU 12 and there is formed a judgment that the movement is quick, the accurate comparison every pixel is difficult to make as described above. In this case, the image data given when the strobe light is emitted and the AWB control value for strobe light are used for data-compression, and the processing for suitably selecting the AWB control value (1) or the AWB control value for strobe light is not carried out.

Further, in the case of photography under backlight or the like, the first exposure in which the strobe light is emitted and the second exposure in which the strobe light is not emitted are carried out. In this photography, when the main object in the second exposure is considerably moved with respect to the main object in the first exposure to produce a new background, a difference between light from the background newly produced and light produced by the reflection of the strobe light cannot be discriminated. For this reason, in the photography using the strobe light under the backlight, it is not possible to accurately determine the contribution degree of the strobe light from the value a/b.

Thus, in a special scene, such as that under backlight, the white balance control is carried out by the CPU 12 using the AWB control value for strobe light, and only in the uniformly dark photographing scene other than the special scene, the processing for suitably selecting the AWB control value (1) or the AWB control value for strobe light is carried out.

Further, in a case where the quantity of light of the image data in a pixel (object area) at which the strobe light does not arrive is smaller than a predetermined value and the scene is dark, the configuration for amplifying the image data by an amplifier is employed. Thereby, the balance of brightness between the main object exposed to the strobe light and the background can be adjusted to adapt to out vision.

In the above embodiment, it was described that the contribution degree of the strobe light is compared every pixel and is obtained. But, the comparison method is not limited to this. That is, a number of pixels constituting the CCD 3 are divided into blocks each of which has a predetermined number of pixels so that data may be compared every block unit. In this manner, data can be compared every block unit. This leads to simplifying the construction of a hardware in a control system.

For example, data may be compared every block of 8×8 pixels on the basis of the JPEG system of static image compression. If so, data can be compared every block unit. This makes it possible to simplify the construction of the hardware in the control system.

In this case, the first exposure in which the strobe light is emitted is carried out and then the second exposure in which the strobe light is not emitted is carried out, as described above. The CPU 12 controls the data processing section 6 to cause characteristic portions, such as a contour in the image, to be extracted as data about a first characteristic portion from the image data obtained in the first exposure by the data processing section 6.

In FIGS. 5(A) and 5(B), (ai, bj) [i=j=1, 2, 3 . . . n] represents the (i, j)-th pixel block having 8×8 pixels in the CCD 3 ('th' is a suffix indicating an ordinal number). Data about the first characteristic portion is extracted one by one from (ai, bj), (ai+1, bj) . . . (a1+n, bj) . . . (ai, bj+1), (ai+1, bj+1) . . . (ai+n, bj+n).

Figure 3:
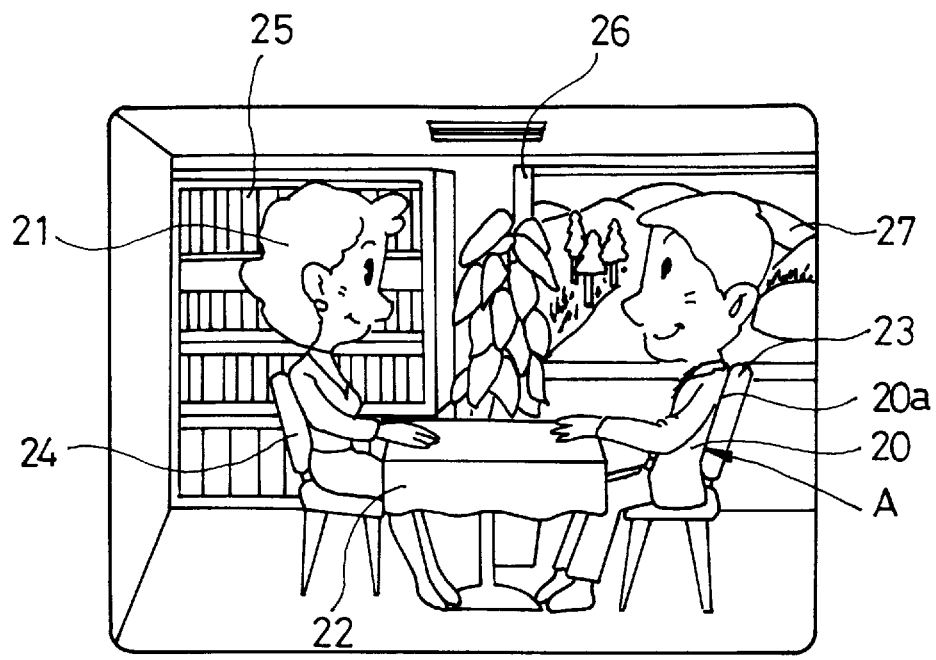
FIGS. 3 and 4 are explanatory views of first and second images photographed by the electronic still camera, respectively.
Figure 4:
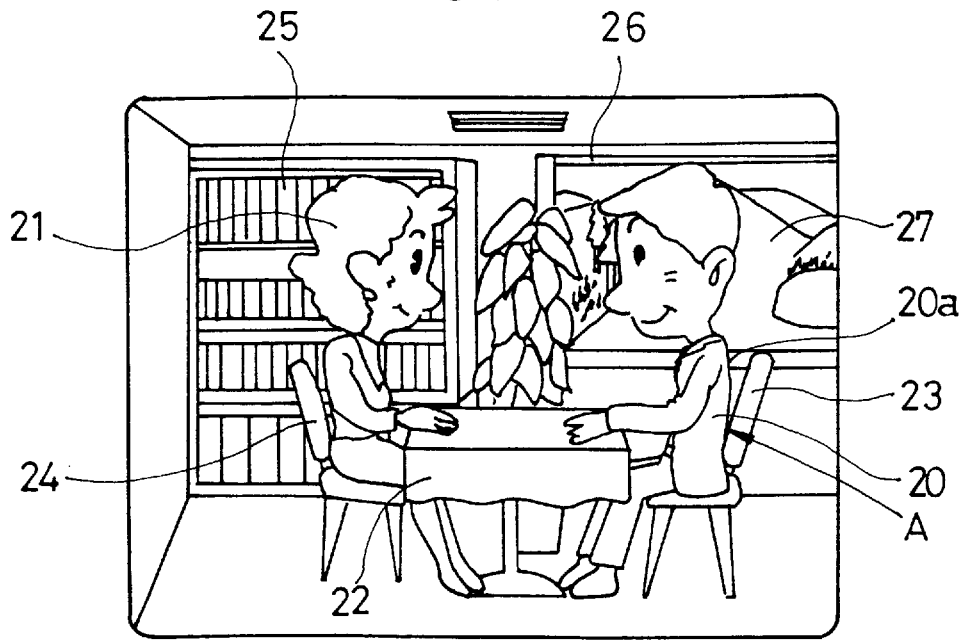

For example, FIG. 3 shows a first photographed image with a flash of light of the strobe 10, and FIG. 4 shows a second photographed image without a flash of light of the strobe 10. Persons 20, 21, a table 22, and chairs 23, 24 which are main objects and a book-shelf 25, a window 26, a distant view 27, etc. which are backgrounds appear on these images. Upper halves of the persons 20, 21 as the main objects have greatly moved. Let it be supposed that the chair 23 is black and the person 20 wears a white suit.

Figure 6:
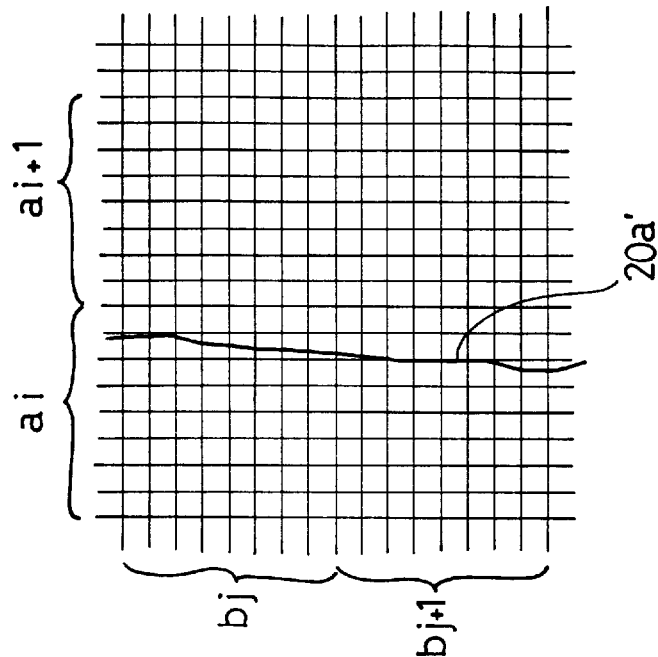
FIGS. 6 and 7 are explanatory views, each showing an example of a contour image of a main object on the CCD of the photographed images of FIGS. 3 and 4.
Figure 7:
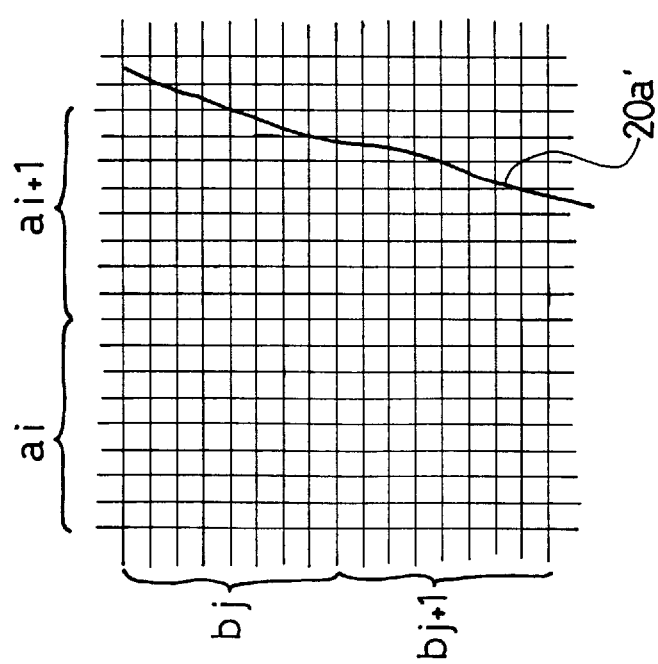

In this case, when a position of a part indicated by arrow A of a contour 20a of the back of the person 20 in FIGS. 3 and 4 is viewed on the CCD 3, a contour image 20a' relative to FIG. 3 falls within (ai+1, bj) and (ai+1, bj+1) as shown in FIG. 6 whereas a contour image 20a' relative to FIG. 4 falls within (ai, bj) and (ai, bj+1) as shown in FIG. 7. Since the amount of reflected light caused by the strobe 10 from the left side of the contour image 20a' is large in this state, the left side of the contour image 20a' in FIGS. 6 and 7 is larger in quantity of light than the right side.

Accordingly, in FIG. 6, since an output (a signal proportional to a quantity of light) from the pixel blocks (ai+1, bj) and (ai+1, bj+1) is large, the leading address of pixels of the pixel blocks (ai+1, bj) and (ai+1, bj+1) is temporarily stored in a memory portion of the data processing section 6. As a result, data about a continuous first characteristic portion, such as a contour, in an image can be obtained.

Likewise, the CPU 12 controls the data processing section 6 to obtain data about a second characteristic portion, such as a contour in an image, obtained in the second exposure. In the second characteristic portion, an output (a signal proportional to a quantity of light) from pixel blocks (ai+1, bj) and (ai+1, bj+1) is extremely small whereas an output from pixel blocks (ai, bj) and (ai, bj+1) is large as shown in FIG. 7. Therefore, the leading address of (ai, bj) and (ai, bj+1) is stored in the data processing section 6.

After that, the CPU 12 causes the signal processing section 6 to compare the data of the first characteristic portion with the data of the second characteristic portion. In the case of FIGS. 6 and 7, since the output of the pixel blocks (ai+1, bj) and (ai+1, bj+1) has greatly varied, it is detected that a marked change has occurred between the first and second photographing scenes, in other words, it is detected that the second photographing scene has greatly moved with respect to the first photographing scene. In this embodiment, for convenience of explanation, it is concluded that a difference in a contour of a main object between pixel blocks adjacent to each other directly leads to a difference in a scene. However, a difference within several pixel blocks is allowable because, in practice, it does not mean a large difference in a scene.

Further, in the embodiment, an example was given in which the color measuring sensor 9 is used to obtain the color temperature information relative to R signal and B signal. However, the color measuring sensor 9 may be omitted as shown in FIG. 8. If so, the color temperature information relative to T and B signals is obtained from an image signal transmitted from the CCD 3.

As described above, according to the electronic still camera of the present invention, a comparison is made between image data obtained when a CCD is exposed to light given from an object after a strobe flashes a light and image data obtained when the CCD is exposed to light from the object without the strobe flashing a light. From a comparison result, a determination is made as to how such a flash of light of the strobe has contributed to photography and, in each optional area of the object, either a white balance control value fixed by a white balance value fixing means which is a value given when the strobe does not flash a light or a predetermined white balance control value given when the strobe flashes a light is suitably selected and accordingly the final white balance control is performed. Therefore, for example, even in a scene where there are mixed a main object at which the light of the strobe can arrive and its background at which the strobe light cannot arrive, both the object and the background are photographed in a good state in which the white balance is maintained between the two.

Further, since the variation of the white balance at a boundary line between the main object and the background can be made smoother, natural white balance control is carried out.

Further, since an AWB control value is prevented from abruptly varying in the respective areas of the object, natural white balance control can be carried out.

Further, by comparing images which have been photographed individually in time, white balance control using an AWB control value for a light of the strobe can be performed without carrying out AWB control processing based on comparison data obtained by comparing image data obtained under a flash of light of the strobe with image data obtained under no flash of light of the strobe when the object moves quickly or when the camera is in panning. As a result, malfunction is prevented.

Further, by stopping the above-mentioned AWB control processing in the case of a special scene, such as that of backlight, malfunction is prevented.

Further, since it is possible to amplify a luminance level of image data in an area of the object at which the light of the strobe does not arrive and which is dark, unbalance of brightness in the image is overcome.

What is claimed is:

1. An electronic still camera comprising:
   an image pick-up element, such as a charge-coupled device, for picking up an object to be photographed;
   a frame memory for temporarily storing image data output from said image pick-up element;
   a strobe means for flashing light onto the object;
   comparison means for, in optional areas of the object, comparing at least image data obtained when said image pick-up element is exposed to light given from the object after said strobe means flashes light onto the object with image data obtained when said image pick-up element is exposed to light given from the object without said strobe means flashing light onto the object;
   determination means for, in each of the optional areas which has been compared by said comparison means, determining how much the light of said strobe means has contributed to photography;
   white balance value fixing means for fixing a white balance control value given when said strobe means does not flash light onto the object; and
   white balance control means for, with respect to image data obtained when said image pick-up element is exposed to light given from the object after said strobe means flashes light onto the object, controlling white balance such that, in each of the compared areas, either the white balance control value fixed by said white balance value fixing means or a predetermined white balance control value given when said strobe means flashes light onto the object is selected in accordance with a determination made by said determination means.

2. The electronic still camera according to claim 1, wherein a white balance control value in each of the compared areas is suitably selected and set from values ranging from the white balance control value fixed by said white balance value fixing means to the predetermined white balance control value given when said strobe means flashes light onto the object on the basis of a contribution degree of the light of said strobe means which is determined by said determination means.

3. The electronic still camera according to claim 2, further comprising:
   regulation means for regulating a selection allowable width of a white balance control value suitably selected from values ranging from the white balance control value fixed by said white balance value fixing means to the predetermined white balance control value given when said strobe means flashes light onto the object.

4. The electronic still camera according to claim 1, further comprising:
   object movement detection means for detecting movement of the object by comparing image data of a plurality of picked-up images with each other, the predetermined white balance control value given, when said strobe means flashes light onto the object, being selected to perform white balance control when said object movement detection means detects that an amount of movement of the object is larger than a predetermined amount.

5. The electronic still camera according to claim 1, wherein in case an image picked up when said strobe means does not flash light onto the object is uniformly smaller in quantity of light than a predetermined quantity over substantially the whole surface of the image, either the white balance control value fixed by said white balance value fixing means or the predetermined white balance control value given when said strobe means flashes light onto the object is selected in each of the optional areas of the object to be determined by said determination means with respect to image data obtained when said image pick-up element is exposed to light given from the object after said strobe means flashes light onto the object in order to perform white balance control, whereas in case of backlight by which a picked-up image is not darkened uniformly over substantially the whole surface of the image, the predetermined white balance value given when said strobe means flashes light onto the object is selected to perform the white balance control.

6. The electronic still camera according to claim 1, further comprising:

amplification means for amplifying image data in an area of the object at which the light of said strobe means does not arrive as a result of determination by said determination means in which a quantity of light is smaller than a predetermined quantity.

7. An electronic still camera comprising:

a charge-coupled device configured to capture an image data of an object to be photographed;

a frame memory configured to temporarily store said image data output from said charge-coupled device;

a strobe device configured to flash a light onto the object;

data processor configured to, in optional areas of the object:

compare at least image data obtained when said charge-coupled device is exposed to light reflected from the object after said strobe device flashes light onto the object with image data obtained when said charge-coupled device is exposed to light reflected from the object without said strobe device flashing light onto the object, and fix a white balance control value given when said strobe device does not flash light onto the object; and a central processor configured to determine, in each of the optional areas which has been compared, how the light of said strobe device has contributed to photography;

wherein, with respect to image data obtained when said charge-coupled device is exposed to light given from the object after said strobe device flashes light onto the object, the data processor is configured to control white balance such that, in each of the compared areas, either the fixed white balance control value or a predetermined white balance control value given when said strobe device flashes the light onto the object is selected in accordance with a determination made by said central processor.

8. The electronic still camera according to claim 7, wherein a white balance control value in each of the compared areas is suitably selected and set from values ranging from the white balance control value fixed by said data processor to the predetermined white balance control value given when said strobe device flashes light onto the object on the basis of a contribution degree of the light of said strobe device which is determined by said central processor.

9. The electronic still camera according to claim 8, wherein said central processor is configured to regulate a selection allowable width of a white balance control value suitably selected from values ranging from the white balance control value fixed by said data processor to the predetermined white balance control value given when said strobe device flashes light onto the object.

10. The electronic still camera according to claim 7, wherein said central processor is configured to detect movement of the object by comparing image data of a plurality of captured images, and provide the predetermined white balance control value, when said strobe device flashes light onto the object, to perform white balance control when said central processor detects that an amount of movement of the object is larger than a predetermined amount.

11. The electronic still camera according to claim 7, wherein when quantity of light from an image picked up when said strobe device does not flash light onto the object is uniformly smaller than a predetermined quantity over substantially the whole surface of the image, the central processor selects in each of the optional areas of the object either the white balance control value fixed by said data processor or the predetermined white balance control value given when said strobe device flashes light onto the object in order to perform white balance control, whereas in case of backlight in which a picked-up image is not darkened uniformly over substantially the whole surface of the image, the predetermined white balance value given when said strobe device flashes light onto the object is selected by the central processor to perform the white balance control.

12. The electronic still camera according to claim 7, further comprising:

an amplifier configured to amplify image data in an area of the object at which the light of said strobe device does not arrive as a result of a determination by said central processor and in which a quantity of light is smaller than a predetermined quantity.

* * * * *